United States Patent Office 3,629,321
Patented Dec. 21, 1971

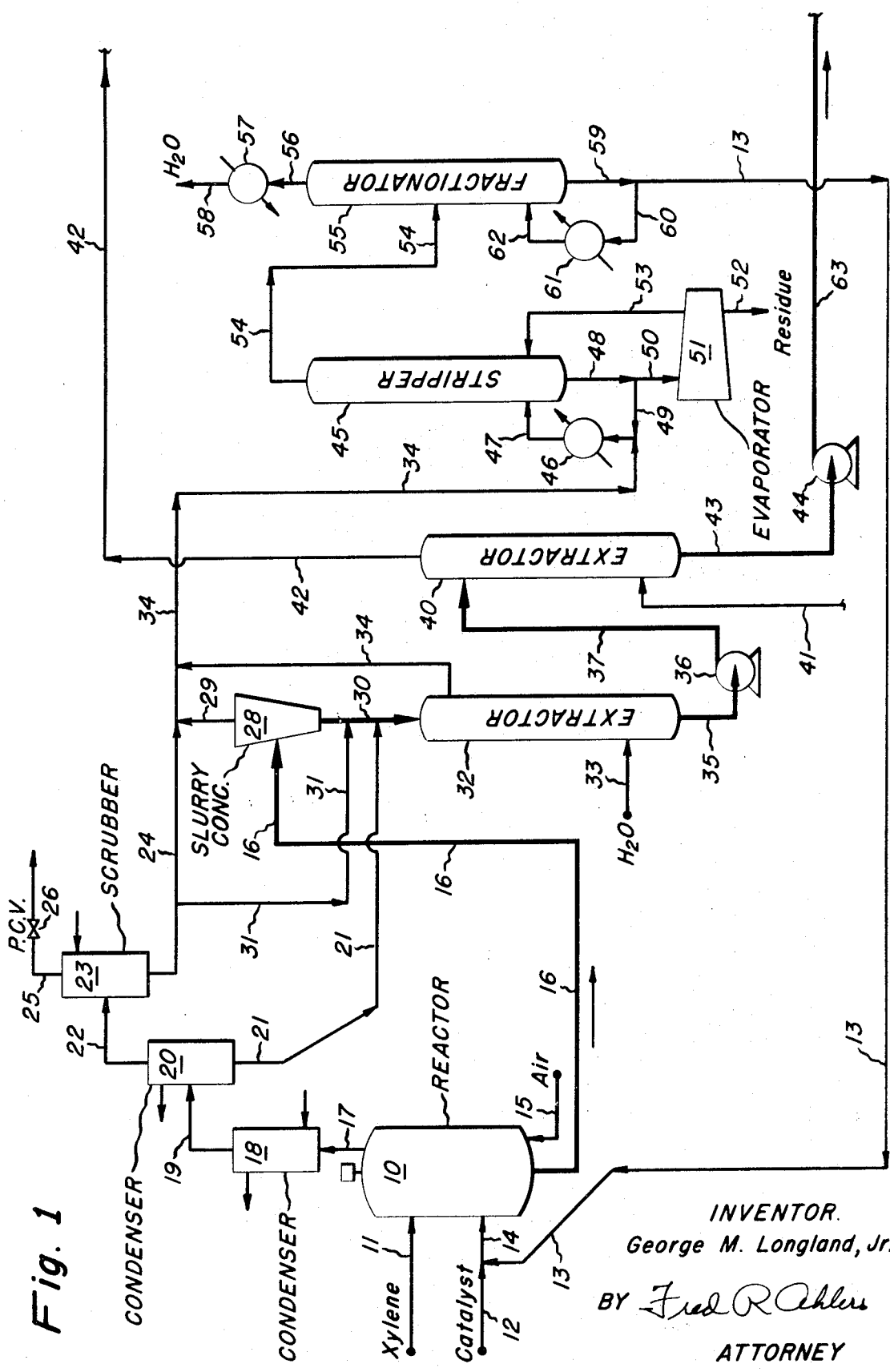

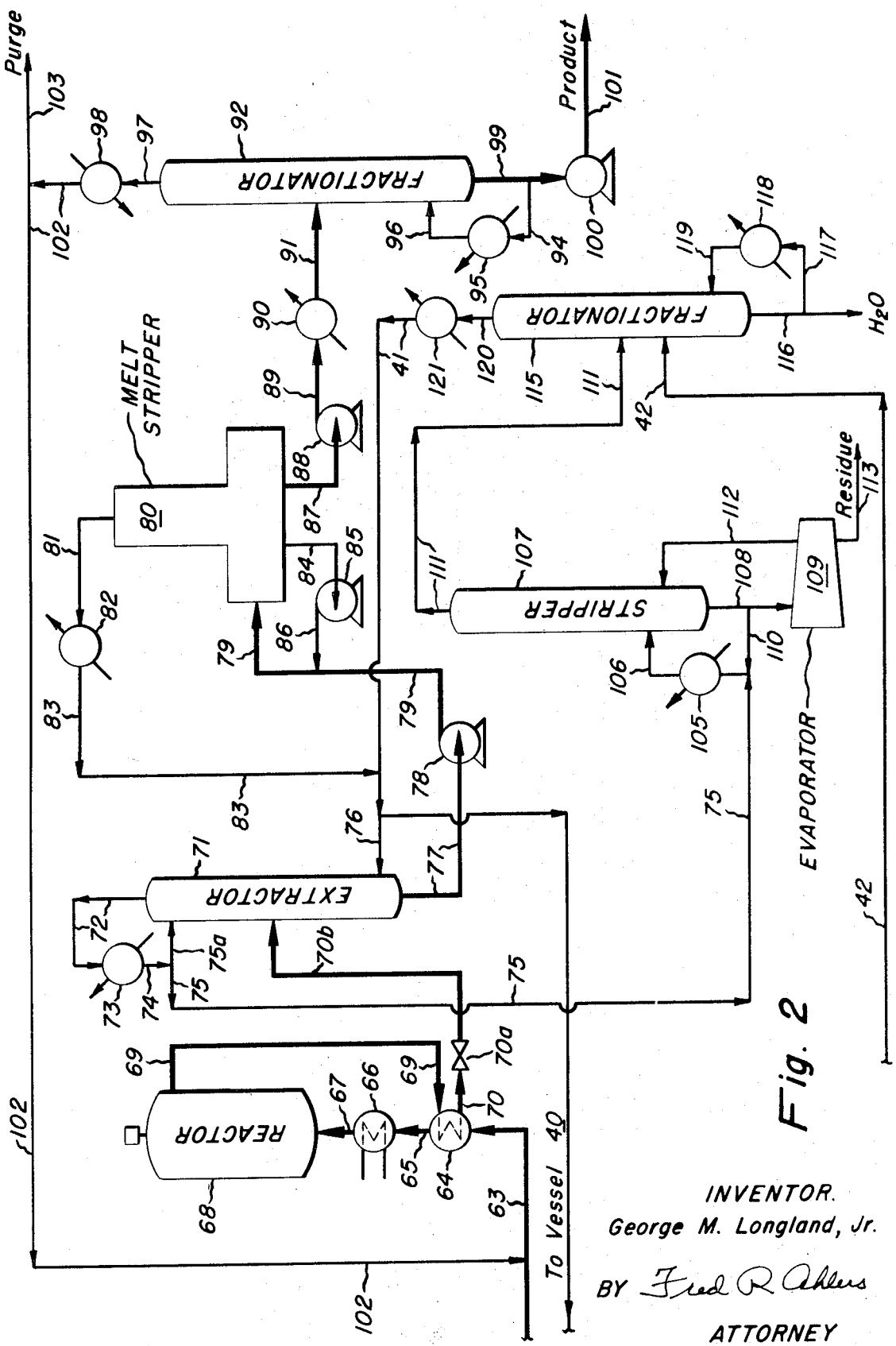

3,629,321
INTEGRATION OF PARA-XYLENE OXIDATION TO TEREPHTHALIC ACID AND ITS ESTERIFICATION TO DIMETHYL TEREPHTHALATE
George M. Longland, Jr., Highland, Ind., assignor to Standard Oil Company, Chicago, Ill.
Filed May 26, 1969, Ser. No. 827,648
Int. Cl. C07c 69/82
U.S. Cl. 260—475 R                    2 Claims

ABSTRACT OF THE DISCLOSURE

Liquid phase oxidation of p-xylene with molecular oxygen-containing gas (e.g., air or commercial oxygen) in presence of acetic acid produces fluid oxidation effluent which is subjected first to simultaneous terephthalic acid crystallization and acetic acid displacement by contact with a countercurrent flow of water and second to simultaneous water displacement by and terephthalic slurry formation in methanol by its countercurrent contact with the first formed slurry of terephthalic acid in water from acetic acid displacement. This provides a slurry of terephthalic acid in methanol as feed to esterification from which a liquid esterification effluent is subjected to simultaneous DMT crystallization and methanol mother liquor displacement by countercurrent contact with cooler fresh methanol thereby producing a slurry of precipitated DMT in fresh methanol.

BACKGROUND OF INVENTION

The preparation of dimethyl terephthalate (DMT) from p-xylene and methanol as starting materials has followed two routes. The first route oxidizes p-xylene with molecular oxygen under liquid phase conditions in the presence of acetic acid and a catalyst system consisting of one or more heavy metals and a side-chain oxidation initiator or promoter such as a source of bromine or acetaldehyde or a methylenic ketone (a ketone having one methyl group and one hydrocarbon group other than a methyl group attached to the carbonyl carbon). Such a catalytic oxidation process is conducted by batchwise or semi-continuous or continuous operation and produces a fluid reaction effluent which is depressurized and cooled to crystallize substantially all of the terephthalic acid as impure product. The impure terephthalic acid is then recovered by some solid-liquid separation, such as filtration, centrifugation, decantation and the like, dried with or without a prior wash to remove adhering mother liquor. Dry terephthalic acid combined with an excess of methanol, such as 3 to 50 parts of methanol per part of terephthalic acid by weight, are reacted with or without an esterification catalyst at a temperature above 150° C. and under pressure to maintain a liquid phase of methanol. The esterification produces a liquid effluent containing DMT together with by-product water, some monoester and other impurities dissolved in the excess methanol. Impure DMT is recovered from the liquid esterification effluent by any one of the several known crystallization techniques and filtration of the resulting slurry of crystalline DMT. The recovered imprue DMT mass is further processed either by recrystallization from methanol or xylene, fractionation or a combination of recrystallization and fractionation or a combination of fractionation and recrystallization to recover DMT in the high purity, about 99.99% pure, required for the ester interchange reaction with ethylene glycol used in the production of polyethylene terephthalate of high molecular weight required for film and fiber manufacture.

The second route to DMT from p-xylene and methanol is conducted by first partially oxidizing p-xylene in the presence of a cobalt catalyst soluble in p-xylene to obtain p-toluic acid which is then separated from p-xylene and esterified with methanol. Methyl p-toluate is oxidized with air to monomethyl terephthalate which is then esterified to DMT. An alternate for the process comprises oxidizing methyl para-toluate and p-xylene with air in the presence of a cobalt catalyst soluble in xylene, distilling off unoxidized p-xylene esterifying with methanol the resulting mixture of terephthalic acid, p-toluic acid, monomethyl terephthalate and DMT, distilling the esterification mixture to recover methyl p-toluate for recycle to the oxidation and an impure DMT distillate which can be purified by recrystallization or by fractionation or by combinations thereof as before mentioned.

Both of the above routes require several crystallizations, solid-liquid separations, drying of intermediate products as well as one or more distillations. Those process steps represent substantial investment in plant apparatus and substantial operation costs. The process of this invention eliminates most of those steps and still permits production of DMT of the high purity requirement for its use in the esterification with ethylene glycol in the production of polyethylene terephthalic acid of high molecular weight for film and fiber manufacture.

SUMMARY OF INVENTION

The process of this invention is an integrated combination of (a) terephthalic acid production by catalytic liquid phase oxidation of p-xylene with oxygen-containing gas in the presence of acetic acid and a catalyst system; and (b) dimethyl terephthalate production by esterification of said terephthalic acid with methanol. The process of this invention integrates the oxidation process (a) with esterification process (b) by the use in the appropriate procedural sequence of a single dual function step of displacement and replacement of product carrier. Such dual function single procedural step includes crystallization of product and displacement of mother liquor by a different liquid such as displacement of acetic acid mother liquor by water, methanol mother liquor by fresh methanol and displacement of one liquid carrier of solid in a slurry by another liquid to form a different slurry.

The integrated process of this invention in its simplest form consists of the following general steps:

(a) catalytic liquid phase oxidation of p-xylene in the presence of acetic acid in an oxidation zone with oxygen-containing gas (e.g. oxygen gas or air) to produce at the temperature and pressure of oxidation a fluid oxidation zone effluent containing acetic acid with catalyst components dissolved therein, both dissolved and undissolved terephthalic acid and aromatic by-product impurities;

(b) concentrating said fluid liquid oxidation zone effluent through the removal of some acetic acid mother liquor solution to a slurry of solid terephthalic acid having a solids content of 25 to 40% by weight;

(c) contacting said slurry concentrate in a first dual function zone with water at a temperature in the range of 50 to 120° C. to crystallize remaining dissolved terephthalic acid, to displace remaining acetic acid mother liquor with water and to form a second terephthalic acid slurry concentrate of 25 to 40% solids content in water;

(d) contacting said second slurry concentrate in a second dual function zone in countercurrent flow with methanol at a temperature in the range of 30 to 50° C. to displace water from the feed slurry and to form a slurry of terephthalic acid in methanol suitably in the amount desired for use in the esterification step;

(e) introducing said slurry as feed into an esterification zone;

(f) contacting the liquid effluent from said esterification in a third dual function zone with liquid fresh methanol at a temperature in the range of 50 to 100° C. fed i- countercurrent flow by feeding fresh methanol near the bottom and liquid esterification effluent to the central portion of the third dual function zone and removing from the third dual function zone an overhead methanol mother liquor stream and a bottom stream which is the bottom of a slurry of precipitated dimethyl terephthalate crystals; and (g) recovering dimethyl terephthalate from said slurry.

The major procedural steps of the integrated process of this invention can each be conducted batchwise, or any one or more conducted continuously and the remainder conducted batchwise or all of them can be conducted continuously. Continuous conduct of all major procedural steps is preferred because such integrated continuous operation of them and their auxiliary procedure steps eliminates the need to gather and store large volumes of solutions and slurries for further processing. The processing conditions, ratio of reactants, catalyst concentrations or ratios to reactants, the manner of processing fluid and vapor streams, transfer of fluid and vapor streams, directed flow of fluid and vapor streams and the manner of conduct of each of the major procedural steps, although hereafter described with respect to integrated continuous operation, can be adapted with appropriate modifications by those skilled in this art to combinations of batchwise and continuous operations.

The first dual purpose zone accomplishes precipitation of dissolved terephthalic acid and acetic acid mother liquor replacement with water. Both are accomplished by contacting a concentrate of fluid oxidation effluent with water suitably at 20 to 100° C., preferably 30 to 50° C., and at the same time forming a slurry of terephthalic acid in water. Advantageously this can be done by introducing the concentrate at the top of a vertical tower and water at the bottom thereof with from 0 to 50, and preferably 10 to 30, percent net upflow of water based on the weight of the mother liquor. Terephthalic acid crystals, those formed in the oxidation zone, and those crystallizing after entering the crystallization-extraction zone, drop down through the water and can be withdrawn as a slurry in water from the bottom of the tower. The total water input is the sum of net upflow of water plus the water in the withdrawn slurry. Advantageously, the density of the acetic acid mother liquor is less than water at the interface and the mother liquor with the 0 to 50 net upflow of water can be readily removed from the top of the first dual purpose zone. The hydraulic head (column height plus water feed pressure) in such a vertical tower containing said first dual purpose zone can be sufficient to offset the pressure of the incoming slurry concentrate.

In the second dual purpose zone contact between the aqueous slurry with methanol upflow sufficient to displace the water as a water-methanol solution, preferably not more than 50 percent each of water and methanol by weight permits terephthalic acid crystals to drop down through methanol and be removed as a slurry having sufficient methanol for the esterification. Here methanol at the same temperature as the water portion of the aqueous feed slurry, preferably 30° to 50° C. is used.

In the third dual purpose zone relatively cooler methanol at a temperature in the range of 20° to 50° C. contacts the liquid esterification effluent, preferably after it has been cooled by indirect heat exchange with the slurry of terephthalic acid in methanol withdrawn from the second dual purpose zone. This third dual purpose zone also advantageously is conducted with a vertical column of fresh methanol in a tower. The fresh methanol need have only a slight net upward flow, less than 50, and preferably 15 to 40 percent based on the methanol solvent in the liquid esterification effluent. Some of the solvent methanol evaporates as the esterification effluent enters the central to upper portion of the methanol column. However, by maintaining the top pressure at 5 to 30 p.s.i.g., the displaced and diluted methanol mother liquor can be withdrawn at the top of the tower as liquid and cooled to 60 to 65° C. and atmospheric pressure before further processing it. A slurry of DMT cystals in fresh methanol is withdrawn from the bottom of methanol column in the tower.

It is preferred to employ vertical columns of displacing fluids in all three of the dual purpose zones employed in the present inventive integrated process because there can be withdrawn from the bottom thereof slurries with the amount of solid and liquid useful for the process step immediately following. Such vertical columns of displacing liquids can be readily maintained in towers of the type useful for liquid-liquid extractors. In one sense those towers as used in the present inventive process do function as extractors and are sometimes hereafter referred to as extractor towers.

To aid in the further understanding of the integrated inventive process, one specific embodiment is described in detail hereafter with particular referecne to the accompanying flow sheet drawings.

THE DRAWINGS

FIG. 1 is a schematic flow sheet drawing illustrating conduct of catalytic liquid phase oxidation in reactor 10, concentration of oxidation effluent in slurry concentrator 28, first dual purpose zone in extractor 32, methanol-water exchange in extractor 40, removal of wet acetic acid from mother liquor in stripper 45 and acetic acid concentration for recycle in fractionation tower 55 and apparatus auxiliary therefor.

FIG. 2 is a schematic flow sheet drawing illustrating in combination conduct of esterification in reactor 68 having stirring at the feed entrance and a quiescent zone at esterification effluent withdrawal, DMT crystallization and methanol mother liquor displacement in third extractor 71, fresh methanol evaporation and DMT melting in melt stripper 80, DMT purification in fractionator 92, separation of wet methanol from methanol mother liquor by stripper 107 and recycle methanol recovery fractionating tower 115 and apparatus auxiliary thereto.

FIGS. 1 and 2 in combination illustrate one embodiment of the conduct of the present inventive integrated process. A detailed description of such specific embodiment will be illustrated with reference to those figures in the example which follows.

EXAMPLE

With reference to FIG. 1, there is conducted the continuous catalytic oxidation of p-xylene with air in the presence of acetic acid in reactor 10 wherein on an hourly basis, there are charged to the stirred oxidation zone in oxidation reactor 10: one pound mole (106 pounds) of p-xylene through conduit 11; acetic acid solution containing the catalyst via conduit 14 and pressurized air via conduit 15. Fluid oxidation effluent is withdrawn from reactor 10 via conduit 16. This fluid effluent containing terephthalic acid can be charged to slurry concentrator 28.

Slurry concentrator 28 is shown as a liquid cyclone but can be any means for effecting concentration of the quenched fluid oxidation effluent under pressure such as a centrifugal classifier or classification column. The fluid oxidation effluent is concentrated by slurry concentrator 28 and the concentrate is discharged through underflow conduit 30 into which also flows aqueous condensate from condensate transfer conduit 21 and, if desired, a portion of scrubber liquor from conduits 24 and 31, thereby effecting quenching of slurry concentrate to a temperature of about 160° C. The quenched slurry concentrate flows into the top of tower extractor 32 filled to about 85% of its volume with water introduced into its lower portion at 40° C. at the rate of 200 pounds per hour through water charge conduit 33. About 234 pounds per hour of acetic acid mother liquor together with a net water diluent upflow of about 47 pounds per hour are discharged through tower overflow conduit 34. Terephthalic acid dissolved in acetic acid mother liquor of the slurry concentrate feed precipitates and with undissolved terephthalic acid (a total terephthalic acid of about 153 pounds per hour) drops down through the column of water moving slowly upward in tower extractor 32. There is withdrawn from extractor 32 a 40° C. slurry of 50% solids through slurry discharge conduit 35 by slurry pump 36 which discharges the slurry of terephthalic acid through slurry transfer conduit 37 into the top portion of extractor 40 for exchange of water by methanol.

The aqueous slurry of terephthalic acid (50% solids) flowing into extractor 40 by way of slurry transfer conduit 37 meets an upwardly moving column of methanol (0 to 2% water) at 40° C. entering extractor 40 by way of methanol recycle conduit 41. Undissolved terephthalic acid (153 pounds per hour) drops downwardly through the column of methanol and is removed as a slurry in methanol by slurry discharge conduit 43 by slurry pump 44 which discharges the slurry under pressure into slurry transfer conduit 63. The upward moving column of methanol contacts at 40° C. the aqueous feed slurry entering tower extractor 40 in its upper portion. There must be a substantial net upflow of methanol which has a lower specific gravity than water to remove water introduced by the slurry. The net upflow of methanol can be varied to provide a diluted methanol of 20 to 70 weight percent water. In this example the net upflow of methanol is 153 pounds per hour and produces a diluted methanol (50% each of water and methanol by weight) overflow discharged through conduit 42 from the top of tower extractor 40. The diluted methanol overflow is distilled with other aqueous methanol as hereafter described with reference to FIG. 2 to recover for recycle methanol having less than 5 and preferably 0 to 2 weight percent water as feed to tower extractor 40 by way of methanol recycle conduit 41.

The amount of methanol introduced into tower extractor 40 in addition to supply the net upflow mentioned above can be further varied according to the ratio of methanol to terephthalic acid desired for the esterification.

Now turning to the esterification step and subsequent processing steps shown in FIG. 2. The esterification of terephthalic acid to dimethyl terephthalate (DMT) is carried out generally at a temperature above methanol's normal boiling point.

The slurry of 153 pounds terephthalic acid (on an hourly basis) in methanol enters esterification reaction vessel 68 through the bottom thereof. In esterification reactor 68 the reactants, reaction products and unused methanol which solubilizes reaction products move upward until they reach a zone near the top of esterification reactor 68 from which esterification effluent (methanol solution of DMT with minor amount of dissolved monoester:MMT) overflows through solution discharge conduit 69 and flows through preheater 64 from which it exits after exchanging heat with feed slurry through effluent transfer conduit 70 and pressure reducer 70a which discharges into effluent transfer conduit 70b.

The esterification effluent from its transfer conduit 70b then enters the central portion of extractor 71 wherein there is an upward flow of a column of 40° C. methanol (0 to 2% water) supplied by methanol feed conduit 76 from methanol recycle conduit 71. The solution in effluent transfer conduit 70b entering crystallizer-extractor 71 has, on an hourly basis, 172 pounds DMT, 9 pounds MMT (monomethyl ester of terephthalic acid, unreacted methanol and by-product water). Extractor 71 can be operated at slightly above atmospheric pressure as disclosed before and in this case is operated at a top pressure of 5 to 7 p.s.i.g. Entering from feed conduit 76 is 421 pounds per hour of methanol (0–2% water) to provide a net upflow of 85 pounds per hour which can cool entering methanol solution to about 65° C. causing DMT to crystallize and drop down through the column of methanol and be removed as a 30% slurry therefrom. The slurry is removed at 571 pounds per hour (336 pounds methanol, 144 pounds DMT and 1.0 pound MMT) by slurry discharge conduit 77 by DMT slurry pump 78 discharging the slurry into DMT slurry transfer conduit 79 as feed for DMT recovery shown in FIG. 2 as being accomplished by fractional distillation. The diluted mother liquor at 5 to 7 p.s.i.g. leaves the top of extractor 71 by overflow conduit 72 and flows through cooler 73 cooled with water and exits therefrom at a temperature below boiling point of the diluted mother liquor, suitably 55 to 60° C., at atmospheric pressure through transfer line 74.

Slurry of DMT in methanol, 30% solids, flows by slurry transfer conduit 79 into melt stripper 80 operated at atmospheric pressure with a pool of molten DMT. Methanol and water are distilled off leaving melt stripper 80 by vapor transfer 81 and water cooled condenser 82 wherein the vapors are condensed.

At a net flow of molten impure DMT of 145 pounds per hour (1.0 pound MMT) taken through discharge conduit 87 from melt stripper 80 by pump 88 discharging through conduit 89 into preheater 90, the molten impure DMT is heated to its boiling point and enters DMT fractionator 92 via conduit 91. Further heat for fractionation is supplied by reboiler 95 which receives bottoms from conduit 94 from discharge conduit 99 for flow through reboiler 95 discharging boiling materials through recycle conduit 96 back into fractionator 92. An overhead forerun fraction of vapor transfer 97 through condenser 98. This overhead forerun fraction may be reprocessed, for example by return of it via transfer line 102 to slurry transfer 63 supplying methanol slurry of terephthalic acid to esterification reactor 68. There is removal from fractionator 92 by discharge conduit 99 and pump 100 high purity (99.99%) DMT product in an amount of 140 to 141 pounds per hour by product conduit 101.

What is claimed is:

1. An integrated process for continuously converting p-xylene and methanol to dimethyl terephthalate of high purity which comprises:
   (a) oxidation of p-xylene in an oxidation zone with oxygen-containing gas in the presence of a liquid phase acetic acid solution of oxidation catalyst and removal from said zone of fluid oxidation effluent containing by-product water, acetic acid with catalysts components dissolved therein and both dissolved and undissolved terephthalic acid and aromatic by-product impurities;
   (b) concentrating said fluid oxidation effluent through the removal of liquid acetic acid solution to a slurry of solid terephthalic acid having a solids content of 25 to 40% by weight;
   (c) contacting said slurry concentrate with water at a temperature in the range of 50 to 120° C. to displace the remaining acetic acid solution with water and to form a second terephthalic acid slurry concentrate of 25 to 40% solids content in water;
   (d) contacting said second slurry concentrate with methanol at a temperature in the range of 30 to 50° C. to displace water and to form a slurry of terephthalic acid in methanol having one weight part of terephthalic acid for each 3 to 6 weight parts of methanol;
   (e) introducing said slurry as feed into an esterification zone;
   (f) withdrawing from the esterification zone a liquid phase methanol solution of methyl esters of terephthalic acid;
   (g) contacting said liquid esterification effluent with liquid fresh methanol at a temperature in the range of 50 to 100° C. in a contacting zone in which liquid fresh methanol is introduced near the bottom thereof, liquid esterification effluent is introduced into the